United States Patent
Bachelder et al.

(10) Patent No.: US 6,411,734 B1
(45) Date of Patent: Jun. 25, 2002

(54) OBJECT IMAGE SEARCH USING VALIDATED SUB-MODEL POSES

(75) Inventors: Ivan A. Bachelder; Karen B. Sarachik, both of Newton, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/212,844

(22) Filed: Dec. 16, 1998

Related U.S. Application Data

(60) Provisional application No. 60/080,682, filed on Apr. 3, 1998.

(51) Int. Cl.$^7$ .................................................. G06K 9/46
(52) U.S. Cl. ........................................ 382/203; 704/241
(58) Field of Search ................................ 382/203, 201, 382/202, 204, 205, 206, 185, 187; 704/241, 240

(56) References Cited

U.S. PATENT DOCUMENTS

| | | | |
|---|---|---|---|
| 4,805,219 A | * | 2/1989 | Baker et al. ................. 381/43 |
| 4,980,971 A | | 1/1991 | Bartschat et al. |
| 5,060,276 A | | 10/1991 | Morris et al. |
| 5,113,565 A | | 5/1992 | Cipolla et al. |
| 5,226,095 A | | 7/1993 | Okumura et al. |
| 5,268,999 A | | 12/1993 | Yokoyama |
| 5,343,028 A | | 8/1994 | Figarella et al. |
| 5,371,690 A | | 12/1994 | Engel et al. |
| 5,434,928 A | * | 7/1995 | Wagner et al. ............... 382/187 |
| 5,471,541 A | | 11/1995 | Burtnyk et al. |
| 5,495,537 A | | 2/1996 | Bedrosian et al. |
| 5,497,451 A | | 3/1996 | Holmes |
| 5,500,906 A | | 3/1996 | Picard et al. |
| 5,545,887 A | | 8/1996 | Smith et al. |
| 5,602,937 A | | 2/1997 | Bedrosian et al. |
| 5,621,807 A | | 4/1997 | Eibert et al. |
| 5,625,715 A | | 4/1997 | Trew et al. |
| 5,627,912 A | | 5/1997 | Matsumoto |

(List continued on next page.)

OTHER PUBLICATIONS

Cognex Corporation, "Chapter 5 Fiducial Finder," *Cognex 4000/5000 SMD Placement Guidance Package User's Manual*, pp. 179–223, Release 3.2 590–0139, Natick, MA, USA, 1996.

(List continued on next page.)

*Primary Examiner*—Andrew W. Johns
*Assistant Examiner*—Seyed Azarian
(74) *Attorney, Agent, or Firm*—Russ Weinzimmer

(57) ABSTRACT

A method is provided for finding a pose of a geometric model of an object within an image of a scene containing the object that includes providing sub-models of the geometric model; and providing found poses of the sub-models in the image. The method also includes selecting sub-models of the geometric model based on pre-fit selection criteria and/or post-fit selection criteria so as to provide selected sub-models of the geometric model. Thus, the invention automatically removes, disqualifies, or disables found sub-model poses when they fail to satisfy certain user-specified requirements. Examples of such requirements include thresholds on deviations between the found sub-model poses and their corresponding expected poses with respect to the final model pose, as well as limits on the sub-model. The remaining, validated sub-models can then be used to re-compute a more accurate fit of the model to the image. The invention also provides methods for ensuring that the new fit conforms to user-specified requirements, such as requiring that skew or aspect components of the final model pose be below some user-specified threshold. The invention not only allows sub-model outliers to be discarded so as to obtain a more close-fitting model pose, but also reduces the possibility of "false positives", i.e., returning a model pose when the model does not exist within the image.

33 Claims, 3 Drawing Sheets

U.S. PATENT DOCUMENTS

| | | | |
|---|---|---|---|
| 5,627,915 A | | 5/1997 | Rosser et al. |
| 5,663,809 A | | 9/1997 | Miyaza et al. |
| 5,828,769 A | | 10/1998 | Burns |
| 5,845,288 A | | 12/1998 | Syeda-Mahmood |
| 5,850,469 A | | 12/1998 | Martin et al. |
| 5,974,169 A | | 10/1999 | Bachelder |
| 6,028,956 A | * | 2/2000 | Shustorovich et al. ...... 382/156 |
| 6,028,959 A | * | 2/2000 | Wange et al. ............... 382/185 |

OTHER PUBLICATIONS

Cognex Corporation, "Chapter 7 Rectilinear Device Inspection," *Cognex 4000/5000 SMD Placement Guidance Package User's Manual*, pp. 269–310, Release 3.2 590–0139, Natick, MA, USA, 1996.

Hoogs et al., "Model–Based Learning of Segmentations", IEEE, pp. 494–499, 1996.

Medina–Mora, R., "An Incremental Programming Environment," *IEEE Transactions on Software Engineering*, September 1981, pp. 472–482, vol. SE–7, No. 5, USA.

Newman et al., "3D CAD–Based Inspection I: Coarse Verification", IEEE, pp. 49–52, 1992.

Ullman, S., "Aligning pictorial descriptions: An approach to object recognition, I: Approaches to Object Recognition," reprinted from *Cognition*, pp. 201–214, vol. 32, No. 3, Cambridge, MA, USA, Aug. 1989.

* cited by examiner

| STATISTICS (A) | FOUND SUBMODEL POSE IN CLIENT REFERENCE FRAME (B) | IDEAL SUBMODEL POSE IN MODEL REFERENCE FRAME (C) | VALID |
|---|---|---|---|
| | | | UNCHECKED |
| | | | UNCHECKED |
| | | | UNCHECKED |
| | | | UNCHECKED |
| | | | UNCHECKED |
| | | | UNCHECKED |
| | | | UNCHECKED |
| | | | |

FIG. 2

OBJECT IMAGE SEARCH USING VALIDATED SUB-MODEL POSES

CROSS-REFERENCE TO RELATED APPLICATIONS

This application claims the benefit of U.S. Provisional Application No. 60/080,682, filed Apr. 3, 1998.

FIELD OF THE INVENTION

This invention relates to machine vision, a particularly to machine vision methods and apparatuses for searching for instances of an image of a pattern or shape within an image.

BACKGROUND OF THE INVENTION

One known way to find the pose of an instance of a particular shape within an image is to create a model of the shape, and then break the model of the shape up into parts called "sub-models", and then find the poses of each of the sub-models in the image, and fit the found poses of each sub-model to the model of the original shape. A particular example of a tool that uses such a strategy is the sub-model search tool, described in the co-pending patent application entitled "A Method and Apparatus for Modeling and Inspecting Objects Using Machine Vision", U.S. patent application Ser. No. 09/054,968, filed Apr. 3, 1998, herein incorporated by reference. This invention automatically breaks up a geometric model into sub-models, roughly finds the entire model within the image, refines the positions of the sub-models within local image neighborhoods, and fits the refined locations of the sub-models to their positions within the model so as to refine the pose of the model.

This sub-model methodology has an advantage of being more tolerant to certain types of deformations between the model and the instance of the model in the image. A major drawback, however, is that substantial errors in the found sub-model poses are therefore possible when sub-models are incorrectly found by the underlying vision tools, or when there is confusing clutter in the image.

SUMMARY OF THE INVENTION

The invention provides a method for finding a pose of a geometric model of an object within an image of a scene containing the object that includes providing sub-models of the geometric model; and providing found poses of the sub-models in the image. The method can also include selecting sub-models of the geometric model based on pre-it selection criteria and/or post-fit selection criteria so as to provide selected sub-models of the geometric model. The invention also provides methods for ensuring that the new fit conforms to user-specified requirements, such as requiring that skew or aspect components of the final model pose be below some user-specified threshold. In the case that these conditions are not met, the entire validation process is performed with the new estimate of model pose.

This retry strategy is itself performed as many times as necessary to either produce a model pose that conforms to user requirements, or until an insufficient number of sub-model poses remain. Therefore, the invention not only allows sub-model outliers to be discarded so as to obtain a more accurate model pose, but also reduces the possibility of "false positives", i.e., returning a model pose when the model does not exist within the image.

The invention automatically removes, disqualifies, or disables found sub-model poses when they fail to satisfy certain user-specified requirements. Examples of such requirements include thresholds on deviations between the found sub-model poses and their corresponding expected poses based on the final model pose, as well as limits on the sub-model statistics (e.g., measurements of the quality of fit between the sub-model and the image at the found pose). The remaining, validated sub-models can then be used to re-compute a (presumably) more accurate fit.

The present invention can serve as a "back end" to a sub-model based shape finder, such as the one disclosed in "Object Image Search Using Sub-models", U.S. patent application Ser. No. 09/054,968, filed Apr. 3, 1998.

In one general aspect, the invention provides a method for finding a pose of a geometric model of an object within an image of a scene containing the object, wherein the method includes providing sub-models of the geometric model; providing found poses of the sub-models in the image; selecting sub-models of the geometric model based on pre-fit selection criteria to provide selected sub-models of the geometric model; and fitting the selected sub-models of the geometric model to respective found poses of the sub-models in the image, so as to provide a pose of the geometric model in the image.

In a preferred embodiment, sub-model statistics are also provided. In a further preferred embodiment, the pre-fit selection criteria includes criteria based on the sub-model statistics. It is also sometimes advantageous for the pre-fit selection criteria to include criteria based on the sub-model poses.

In some embodiments, an initial pose is provided of the geometric model in the image.

In other embodiments, the pre-fit selection criteria include criteria based on a deviation of the found poses of the sub-models from expected poses of the sub-models, the expected poses being computed using the sub-models of the geometric model and the initial pose of the geometric model in the image.

In preferred embodiments, the sub-model statistics include measurements of the quality of fit between each sub-model and the image at the found pose of that sub-model.

In some embodiments, providing the found poses of the sub-models includes using a sub-model-based location method.

The method can also include checking the pose of the geometric model in the image using pose quality criteria, and discarding the pose if it does not satisfy the pose quality criteria.

In another general aspect of the method of the invention, the method includes providing initial sub-models of the geometric model; providing found poses of the sub-models in the image; fitting the initial sub-models of the geometric model to respective found poses of the sub-models in the image, so as to provide an intermediate pose of the geometric model in the image; selecting sub-models based on post-fit selection criteria to provide selected sub-models; and only if selecting sub-models based on post-fit selection criteria does not select all of the initial sub-models, fitting the selected sub-models of the geometric model to respective found poses of the sub-models in the image, so as to provide a refined pose of the geometric model in the image. In a preferred embodiment, this general aspect of the method further includes providing sub-model statistics. In a preferred embodiment, the sub-model statistics include measurements of the quality of fit between each sub-model and the image at the found pose of that sub-model.

In another preferred embodiment, this general aspect of the method can also include providing an initial pose of the geometric model in the image.

In preferred embodiments the post-fit selection criteria includes criteria based on the sub-model statistics and/or sub-model poses. Also, the post-fit selection criteria can include criteria based on a deviation of the found poses of the sub-models from expected poses of the sub-models, the expected poses being computed using the sub-models of the geometric model and the initial pose of the geometric model in the image. Further, the post-fit selection criteria can include criteria based on a deviation of the found poses of the sub-models from expected poses of the sub-models, the expected poses being computed using the sub-models of the geometric model and the intermediate pose of the geometric model in the image.

In preferred embodiments, providing the found poses of the sub-models includes using a sub-model-based location method.

In further preferred embodiments, the method also includes checking one of the intermediate pose of the geometric model and the refined pose of the geometric model in the image using pose quality criteria, and discarding the pose if it does not satisfy the pose quality criteria, and then returning to selecting sub-models.

In another general aspect of the invention, a method is provided for finding the pose of a geometric model of an object within an image of a scene containing the object, wherein the method includes providing sub-models of the geometric model; providing found poses of the sub-models in the image; selecting sub-models based on pre-fit selection criteria to provide pre-fit selected sub-models; fitting the pre-fit selected sub-models of the geometric model to respective found poses of the sub-models in the image, so as to provide an intermediate pose of the geometric model in the image; selecting sub-models based on post-fit selection criteria to provide post-fit selected sub-models; and, only if selecting sub-models based on post-fit selection criteria does not select all of the sub-models, returning to selecting sub-models based on pre-fit selection criteria. In a preferred embodiment, this aspect of the method further includes checking one of the intermediate pose of the geometric model and the refined pose of the geometric model in the image using pose quality criteria, and discarding the pose if it does not satisfy the pose quality criteria, and then returning to selecting sub-models based on pre-it selection criteria.

BRIEF DESCRIPTION OF THE DRAWING

The invention will be more fully understood from the following detailed description, in conjunction with the following figures, wherein:

FIG. 2 is a table of sub-model information, having one row per sub-model, each row including the found sub-model pose in the client reference frame, the ideal sub-model pose in the model reference frame and statistics. This table is used by both the sub-model validator module, and the model-client fitter.

DETAILED DESCRIPTION OF PREFERRED EMBODIMENTS

Figure 1:
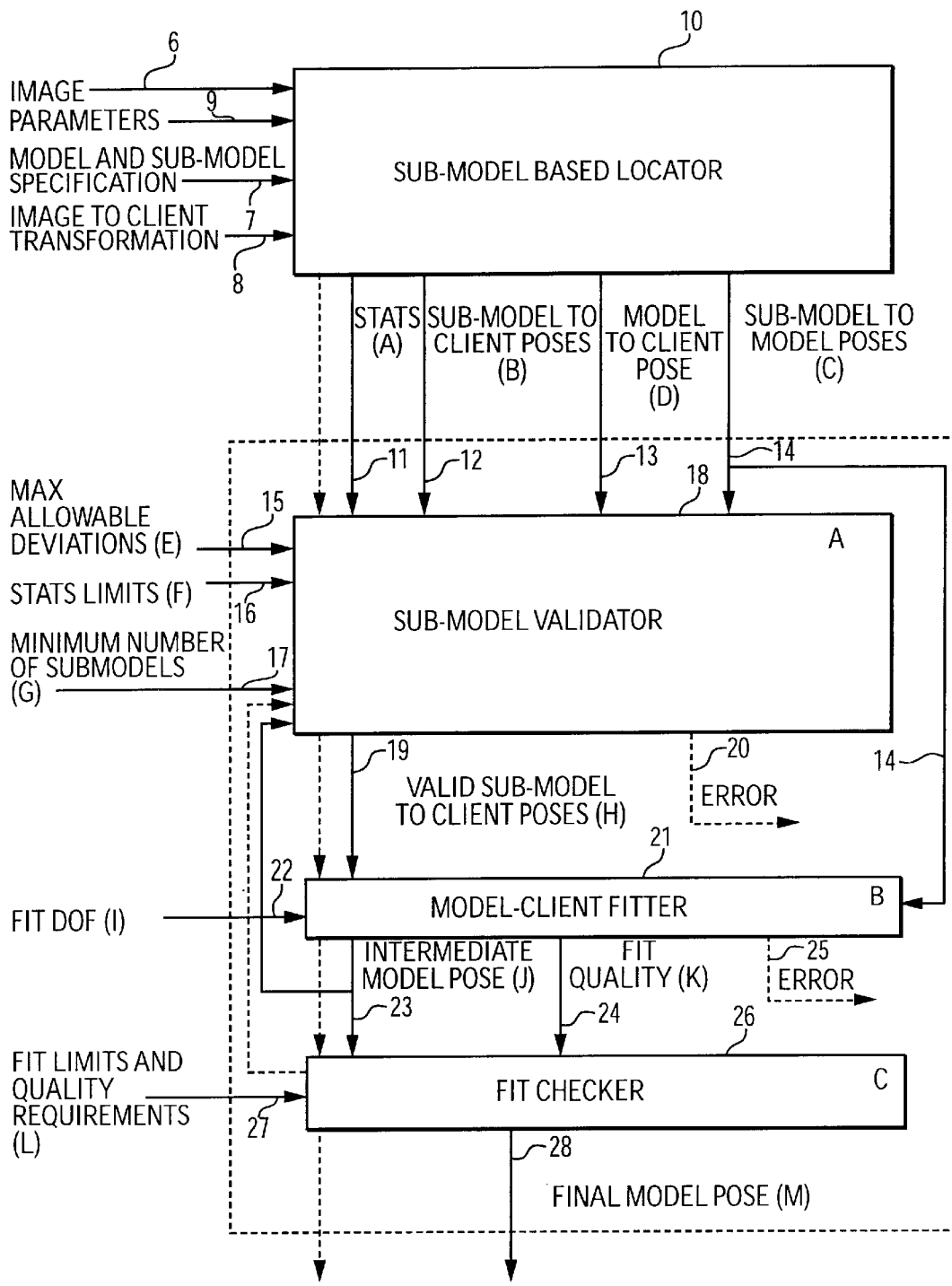
FIG. 1 is a block diagram showing data flow and control flow of the sub-model validator, cooperative with a sub-model based locator, a model-client fitter, and a fit checker.

With reference to FIG. 1, the input to the invention is provided by any sub-model based shape finder 10, which itself takes as input an image 6, a shape model 7, a mapping 8 between the image space and an arbitrary reference frame (referred to hereinafter as the "client" reference frame), and parameters 9 specific to the tool itself. It 10 determines the pose of the shape model and the sub-models in the client's reference frame ((d) and (b) respectively in FIG. 1), the ideal poses of each sub-model within the model's reference frame ((c) in FIG. 1), and statistics concerning how well the shape model and sub-models match the image ((a) in FIG. 1). An example of a tool that can provide this functionality is described in co-pending patent application Ser. No. 09/054,968, filed Apr. 3, 1998, incorporated herein by reference.

The Sub-model Validator 18 takes as input all of the output of the sub-model based shape finder 10, which necessarily includes the found positions of the sub-models in the client reference frame 12 (sub-model to client poses ((b) in FIG. 1), the ideal sub-model positions in the reference frame of the model 14 (sub-model to model poses (c) in FIG. 1), and the found position of the entire model in the reference frame of the client 13 (model to client pose (d) in FIG. 1). In addition, the Sub-model Validator also takes the maximum allowable deviations 15 (e) between each of the found sub-model poses in client space and the expected poses (computed using the model to client pose), certain requirements on the statistics for each sub-model 16 (f) (such as quality of fit with the image), and a minimum number of sub-models 17 (g), which can be specified as an absolute number, a percentage of the total number of sub-models, or any other figure of merit. It also takes an intermediate model pose determined later downstream 23 in the process by the Model-Client Fitter (the entire process is iterative). It computes the deviations between the found sub-model poses 12 and the expected sub-model poses 14 computed using both the model to client pose 13 and intermediate model pose 23. It removes any sub-model that does not meet the required deviation or statistics criteria, and outputs the valid sub-model poses 19. If there are fewer than the user-specified minimum number of sub-models following this discard phase, an error signal 20 is output.

The Model-Client fitter 21 takes three inputs: the valid found sub-model poses in the reference frame of the client 19 (h), the corresponding ideal sub-model poses within the reference frame of the model 14 (c), and the final fit degrees of freedom 22 as specified by the user. It computes the best pose of the entire model in the reference frame of the client 23, called the intermediate model to client pose, with the desired degrees of freedom (using, for example, least squares), and evaluates the quality of the fit 24 (for example, the RMS error of the found to ideal sub-model poses in client reference frame). If there are an insufficient number of valid found sub-model poses to perform the desired fit, it outputs an error signal 25.

The Fit Checker 26 takes as input the intermediate model to client pose 23 and the fit quality 24, as well as user-specified fit limits and quality requirements 27 (e.g., the maximum allowed skew in the pose, and the maximum allowed RMS error). If any of the requirements are not met, control is passed back to the Sub-model Validator 18 for more processing with the latest model to client pose estimate 13. Otherwise, the intermediate model to client pose 23 is output as the final model to client pose 28.

FIG. 2 shows the per sub-model information 11 (a), 12 (b) and 14 (c) organized in a table with one entry per sub-model. This table is used by both the sub-model validator module (A) and the model-client fitter (B). The sub-model validator module uses the "valid" column in the table to pass information to the model image fitter. There are three values for the valid column: unchecked, valid, and invalid. The table is initialized such that the value in this column is "unchecked".

Figure 3:
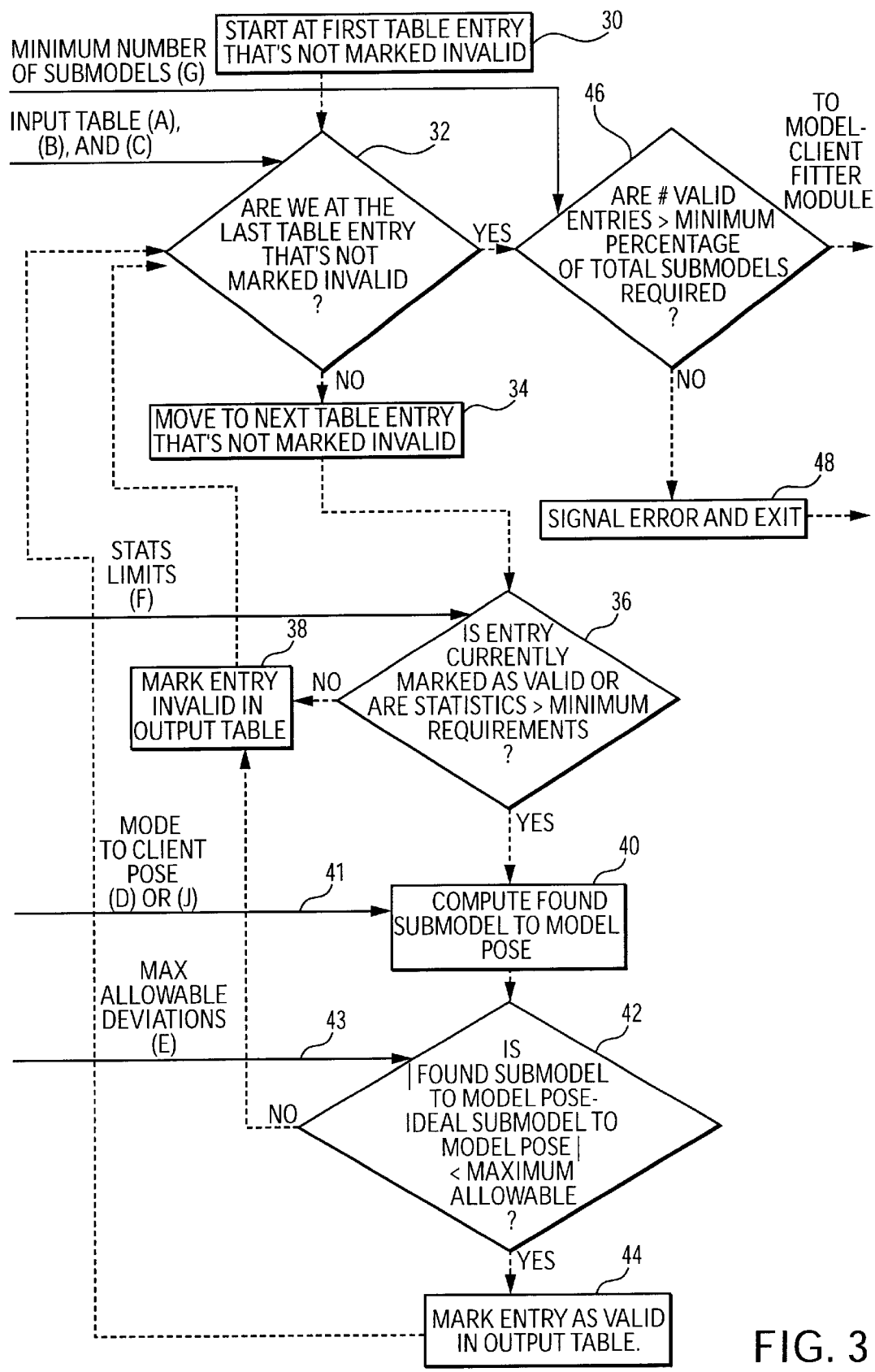
FIG. 3 is a flow chart illustrating the detailed operation of the sub-model validator of FIG. 1.

The sub-model validator 18 of FIG. 1 is illustrated in detail in FIG. 3. Reference numbers in parentheses indicate steps of a method. Data flow is indicated by the solid lines, while bold dashed lines indicates control flow.

Control starts at step (30) so as to start at the first table entry of the table of FIG. 2 that is not marked invalid, and iterates (32) for each table entry that is not marked invalid (note that an entry marked as "invalid" will remain so until the table is re-initialized, which occurs when any of the inputs to the Sub-model Validator change.). For each such table entry, if the "valid" field has the value "unchecked", then the statistics passed in from the sub-model based locator used to locate the sub-model in the image are checked (36) against the user specified statistics requirements. For example, if the Cognex search tool were used to locate the sub-models in the image, relevant limits on the statistics would be the minimum search score. Note that if the value of the valid field is "valid", this means that we are in pass #2 or greater of the sub-model validator, which means that this sub-model must have previously passed this statistics test, so a current statistics test is superfluous.

If the sub-model statistics pass this test, the found sub-model pose in the reference frame of the model is computed (40) by composing the pose of the found sub-model in the client reference frame 41 ((b), from the sub-model information table) with the position of the client reference frame in the reference frame of the model (this is the inverse of either input (d), if this is the first pass through the sub-model validator, otherwise it is the intermediate model to client pose from the model-client fitter (j)).

The found sub-model pose in the model's reference frame (called "found sub-model to model pose") is checked against (42) the ideal sub-model pose in the model's reference frame (called "ideal sub-model to model pose", (c) from the table), and the difference is checked against the maximum allowable deviation information 43, input by the user (e). The current implementation checks only the translational component of the poses for deviation, however, all degrees of freedom contained in the pose (skew, x scale, y scale, and angle) can be validated in this fashion. If any component of this difference is greater than the maximum allowable by the user inputs, this entry is marked as invalid (38) in the table, otherwise it is marked as valid (44).

When all the sub-model table entries have been validated in this fashion, the total number of remaining valid sub-models is checked against (46) a minimum number of total sub-models (g), and if the number is less than this, the control flow terminates with an error (48). Otherwise, control is passed to the model-client fitter 28.

The Model-Client Fitter 21 takes three inputs: the valid found sub-model poses 19 in the reference frame of the client, the corresponding ideal sub-model poses 14 within the reference frame of the model, and the final fit degrees of freedom 22 as specified by the user. It computes the best pose of the entire model in the reference frame of the client, called the intermediate model to client pose 23, with the desired degrees of freedom, such as translation, rotation, scale, skew, or aspect. This may be accomplished by minimizing the sum squared distances between the found sub-model locations (points) in client space and the locations of the corresponding ideal sub-model locations projected into client space via the model-to-client pose (a least squares approach). The DOFs (x, y, angle, scale, etc.) that are allowed to vary in the model-to-client pose may be constrained by the client.

The following procedure may, for example, be used to perform a least squares fit:

1. Let the point $p_k$, be the ideal position of the k'th sub-model in the model reference frame (the translation component of the pose of the sub-model in the model reference frame).
2. Let the point $P'_k$ be the (corresponding) found position of the k'th sub-model as measured in the client reference frame (the translation component of the pose of the found sub-model in the client reference frame).
3. The pose of the model in the client reference frame, which we are trying to find, can be denoted by a linear transform F. Note that the exact form of F depends on how many DOFs are allowed to vary in the pose (e.g., translation, orientation, scale, aspect, and skew).
4. Let the mapping of a point p' measured in the client reference frame to the model reference frame be given by Fp'.
5. Find the transform F that minimizes the sum over all k (over all sub-models) of $|FP'_k - P_k|^2$. Depending on the form of F, there may or may not be a closed form solution to this minimization. Otherwise, an iterative numerical solution can be determined. Both solutions are known in the art.

Another less accurate technique would be to align the moments (center of mass and 1st moments of inertia) of the sub-model spatial arrangements in full model space with those computed for the found spatial arrangments in client space. Several alternative fit strategies can be used and are generally known in the art. Regardless of the technique, this step will generally yield various statistics 24, such as fit quality. For example, a least square fit may provide the sum-squared error for the final pose.

Other modifications and implementations will occur to those skilled in the art without departing from the spirit and the scope of the invention as claimed. Accordingly, the above description is not intended to limit the invention except as indicated in the following claims.

What is claimed is:

1. A method for finding a pose of a geometric model of an object within an image of a scene containing the object, the method comprising:
   providing sub-models of the geometric model;
   providing found poses of the sub-models in the image;
   selecting sub-models of the geometric model based on pre-fit selection criteria to provide selected sub-models of the geometric model; and
   fitting the selected sub-models of the geometric model to respective found poses of the sub-models in the image, so as to provide a pose of the geometric model in the image.

2. The method of claim 1, further comprising:
   providing sub-model statistics.

3. The method of claim 2, wherein the pre-fit selection criteria includes criteria based on the sub-model statistics.

4. The method of claim 1, wherein the pre-fit selection criteria includes criteria based on the sub-model poses.

5. The method of claim 1, further comprising:
   providing an initial pose of the geometric model in the image.

6. The method of claim 5, wherein the pre-fit selection criteria includes criteria based on a deviation of the found poses of the sub-models from expected poses of the sub-models, the expected poses being computed using the sub-models of the geometric model and the initial pose of the geometric model in the image.

7. The method of claim 3, wherein the sub-model statistics include measurements of the quality of fit between each sub-model and the image at the found pose of that sub-model.

8. The method of claim 1, wherein providing the found poses of the sub-models includes using a sub-model-based location method.

9. The method of claim 1, further comprising:
checking the pose of the geometric model in the image using pose quality criteria, and discarding the pose if it does not satisfy the pose quality criteria.

10. A method for finding the pose of a geometric model of an object within an image of a scene containing the object, the method comprising:
providing initial sub-models of the geometric model;
providing found poses of the sub-models in the image;
fitting the initial sub-models of the geometric model to respective found poses of the sub-models in the image, so as to provide an intermediate pose of the geometric model in the image;
selecting sub-models based on post-fit selection criteria to provide selected sub-models; and
only if selecting sub-models based on post-fit selection criteria does not select all of the initial sub-models, fitting the selected sub-models of the geometric model to respective found poses of the sub-models in the image, so as to provide a refined pose of the geometric model in the image.

11. The method of claim 10, further comprising:
providing sub-model statistics.

12. The method of claim 11, wherein the post-fit selection criteria includes criteria based on the sub-model statistics.

13. The method of claim 10, wherein the post-fit selection criteria includes criteria based on the sub-model poses.

14. The method of claim 10, further comprising:
providing a initial pose of the geometric model in the image.

15. The method of claim 14, wherein the post-fit selection criteria includes criteria based on a deviation of the found poses of the sub-models from expected poses of the sub-models, the expected poses being computed using the sub-models of the geometric model and the initial pose of the geometric model in the image.

16. The method of claim 14, wherein the post-fit selection criteria includes criteria based on a deviation of the found poses of the sub-models from expected poses of the sub-models, the expected poses being computed using the sub-models of the geometric model and the intermediate pose of the geometric model in the image.

17. The method of claim 12, wherein the sub-model statistics include measurements of the quality of fit between each sub-model and the image at the found pose of that sub-model.

18. The method of claim 10, wherein providing the found poses of the sub-models includes using a sub-model-based location method.

19. The method of claim 10, further comprising:
checking one of the intermediate pose of the geometric model and the refined pose of the geometric model in the image using pose quality criteria, and discarding the pose if it does not satisfy the pose quality criteria, and then returning to selecting sub-models.

20. A method for finding the pose of a geometric model of an object within an image of a scene containing the object, the method comprising:
providing sub-models of the geometric model;
providing found poses of the sub-models in the image;
selecting sub-models based on pre-fit selection criteria to provide pre-fit selected sub-models
fitting the pre-fit selected sub-models of the geometric model to respective found poses of the sub-models in the image, so as to provide an intermediate pose of the geometric model in the image;
selecting sub-models based on post-fit selection criteria to provide post-fit selected sub-models; and
only if selecting sub-models based on post-fit selection criteria does not select all of the sub-models, returning to selecting sub-models based on pre-fit selection criteria.

21. The method of claim 20, further comprising:
providing sub-model statistics.

22. The method of claim 21, wherein the pre-fit selection criteria includes criteria based on the sub-mode statistics.

23. The method of claim 21, wherein the post-fit selection criteria includes criteria based on the sub-model statistics.

24. The method of claim 20, wherein the pre-fit selection criteria includes criteria based on the sub-model poses.

25. The method of claim 20, wherein the post-fit selection criteria includes criteria based on the sub-model poses.

26. The method of claim 20, further comprising:
providing a initial pose of the geometric model in the image.

27. The method of claim 26, wherein the post-fit selection criteria includes criteria based on a deviation of the found poses of the sub-models from expected poses of the sub-models, the expected poses being computed using the sub-models of the geometric model and the initial pose of the geometric model in the image.

28. The method of claim 26, wherein the post-fit selection criteria includes criteria based on a deviation of the found poses of the sub-models from expected poses of the sub-models, the expected poses being computed using the sub-models of the geometric model and the intermediate pose of the geometric model in the image.

29. The method of claim 26, wherein the pre-fit selection criteria includes criteria based on a deviation of the found poses of the sub-models from expected poses of the sub-models, the expected poses being computed using the sub-models of the geometric model and the initial pose of the geometric model in the image.

30. The method of claim 26, wherein the pre-fit selection criteria includes criteria based on a deviation of the found poses of the sub-models from expected poses of the sub-models, the expected poses being computed using the sub-models of the geometric model and the intermediate pose of the geometric model in the image.

31. The method of claim 21, wherein the sub-model statistics include measurements of the quality of fit between each sub-model and the image at the found pose of that sub-model.

32. The method of claim 20, wherein providing the found poses of the sub-models includes using a sub-model-based location method.

33. The method of claim 20, further comprising:
checking one of the intermediate pose of the geometric model and the refined pose of the geometric model in the image using pose quality criteria, and discarding the pose if it does not satisfy the pose quality criteria, and then returning to selecting sub-models based on pre-fit selection criteria.

* * * * *